United States Patent [19]

Ribour et al.

[11] 3,748,584

[45] July 24, 1973

[54] APPARATUS FOR FEEDING A SINGLE SIDEBAND RECEIVER

[75] Inventors: Jean Louis Ribour, La Celle St. Cloud; Michel Georges Poullain, Arcueil, both of France

[73] Assignee: International Standard Electric Corporation, New York, N.Y.

[22] Filed: Feb. 9, 1971

[21] Appl. No.: 113,910

[52] U.S. Cl. .............. 325/492, 179/1 VC, 325/330, 325/395

[51] Int. Cl. .............................................. H04b 1/16

[58] Field of Search ...................... 179/1 VC, 1 SW; 307/273, 291, 293; 325/329, 330, 389, 395, 396, 492

[56] References Cited

UNITED STATES PATENTS

| | | | |
|---|---|---|---|
| 1,922,627 | 8/1933 | Mathes | 325/52 |
| 2,912,574 | 11/1959 | Gensel | 325/492 X |
| 3,488,596 | 1/1970 | Webster et al. | 325/492 |
| 3,599,100 | 8/1971 | Ward | 325/492 |

*Primary Examiner*—Benedict V. Safourek
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

A control device is provided for supplying power to a SSB receiver during a watching period. During periods between transmissions, receiver power controlled by means of a clock is supplied alternatively at normal and reduced levels. A device for detection of speech signals allows the search for transmissions during the normal power supply periods. If the search detects transmissions, normal power supply is kept; if search fails, power supply is reduced at the end of the concerned period.

6 Claims, 4 Drawing Figures

Inventor
J. L. RIBOUR-M. G.POULLAIN
By O. P. Warner
Attorney

APPARATUS FOR FEEDING A SINGLE SIDEBAND RECEIVER

The present invention relates to receiver stations for receiving speech signals on a single side band (SSB), such as certain radio-telephones. It relates to a device allowing a considerable reduction in the expenditure of energy during a watching period.

It is known that during a watching period, that is, of waiting to receive transmission, the feeding of some elements of a receiver is not necessary for it expends uselessly the energy of the source, especially in the case of feeding by batteries. A presently used process consists in periodically verifying during the normal operation of the receiver the presence or absence of received transmission, then in case of absence to return to a state of reduced power level, the states of normal power level for verification and of reduced power level being periodically repeated until detection of a received transmission.

For a receiver station operating in the VHF band, the detection of a transmission is obtained by the detection of its carrier wave; the receiver is in this case tuned to the frequency of the carrier wave and is periodically placed into listening; from reception of a carrier wave equal to that to which it is tuned, the apparatus is kept in continuous listening. Such a process cannot be used with a SSB receiver receiving speech signals. In fact the carrier wave is suppressed and it is then impossible to tune the receiver to the frequency of the carrier wave. Moreover the detected signals are intermingled with noise.

To overcome these disadvantages the present invention proposes a simple watching device allowing the power consumption of a single side band receiver to be reduced, during a waiting period, by periodic cut off of its feed.

According to the invention the watching device is characterized in that it comprises a device for detection of speech signals in the presence of noise, controlling the operation of an electronic clock the period of which is composed of a short time during which the receiver is fed normally and of a long time during which the receiver is fed in a reduced manner, the long time and the short time being in a given ratio, for example of five, the clock controlling the feeding of the receiver in order to make the feeding pass at its own frequency in the state of normal power level and in the state of reduced power level, the clock remaining in the state of control of power level in the case of detection of speech signals.

According to a characteristic of the invention, the watching device comprises a first delay circuit inserted between the detection device and the clock, the time constant of this first circuit being greater than the mean duration of interruption between two consecutive words of a conversation.

According to another characteristic of the invention, the watching device comprises a second delay circuit inserted between the output of the clock and the output of the detection device, the time constant of this second circuit being at least equal to the duration of the establishment of the normal service power level of the receiver.

According again to another characteristic of the invention the detection device of speech signals in the presence of noise can with advantage be that described in the French Patent No. 1,494,154 filed by the applicant on June 30, 1966.

Other characteristics of the invention will appear from the detailed description given below. It is well understood that the description and the drawing are only given by way of indication and in no way limiting the invention.

Figure 3A:
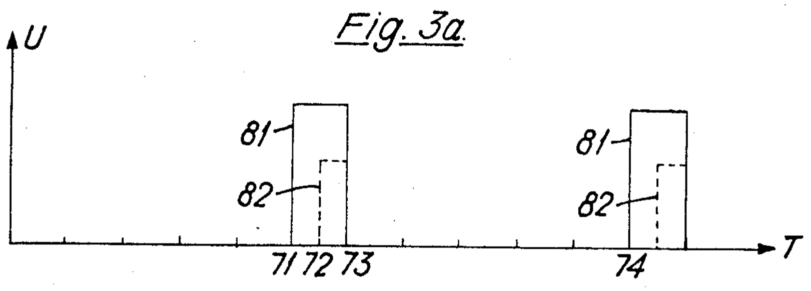
Figure 3B:
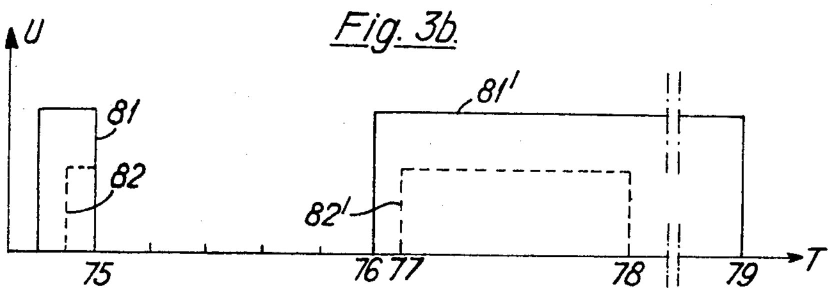

FIGS. 3*a* and 3*b* illustrate with the help of curves the process of operation of the invention.

Figure 1:
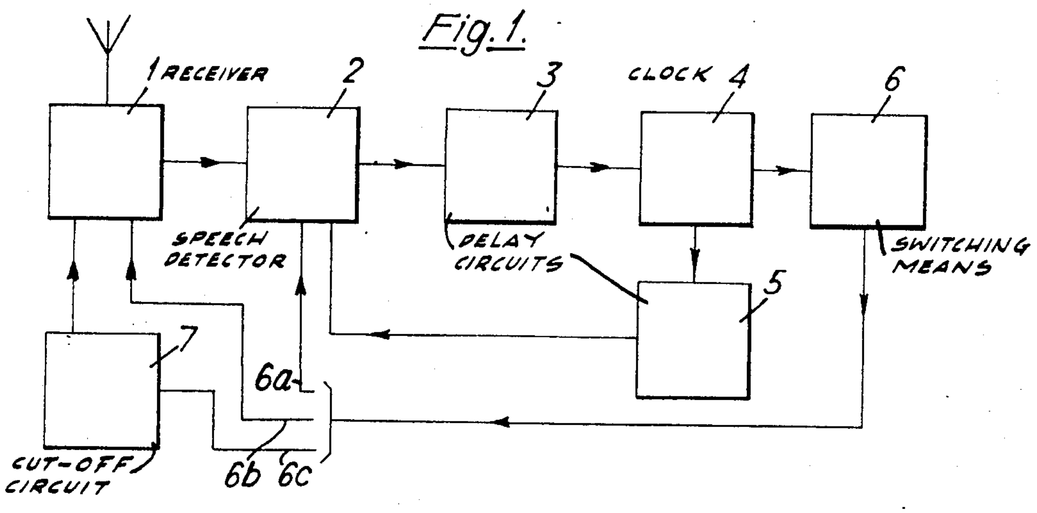
FIG. 1 shows in synoptic form a watching device conceived according to the invention.

Referring to the schematic of FIG. 1, there is found at 1 a conventional SSB receiving chain, that is the receiver properly so called. A speech signal detection circuit 2 is connected to this chain 1. This circuit 2 delivers a control signal to the clock 4 through a first delay circuit 3.

The clock 4 is associated with a second delay circuit 5, and with switching means 6 allowing, on the one hand, the feed of the speech signals detection device 2 to be cut, and on the other hand also the feed of the receiver properly so called 1 to be cut. In certain cases there can be provided a "feed cut-off" for the receiver. This type of feed is conventional and plays the part at once of a direct current/direct current converter and of a voltage regulator. This feeding proceeds by cutting off the input voltage and its yield is higher than that of a converter-regulator assembly. The circuit allowing the feed of the receiver to be "cut-off" is referenced 7 and is connected directly to the receiver.

Figure 2:
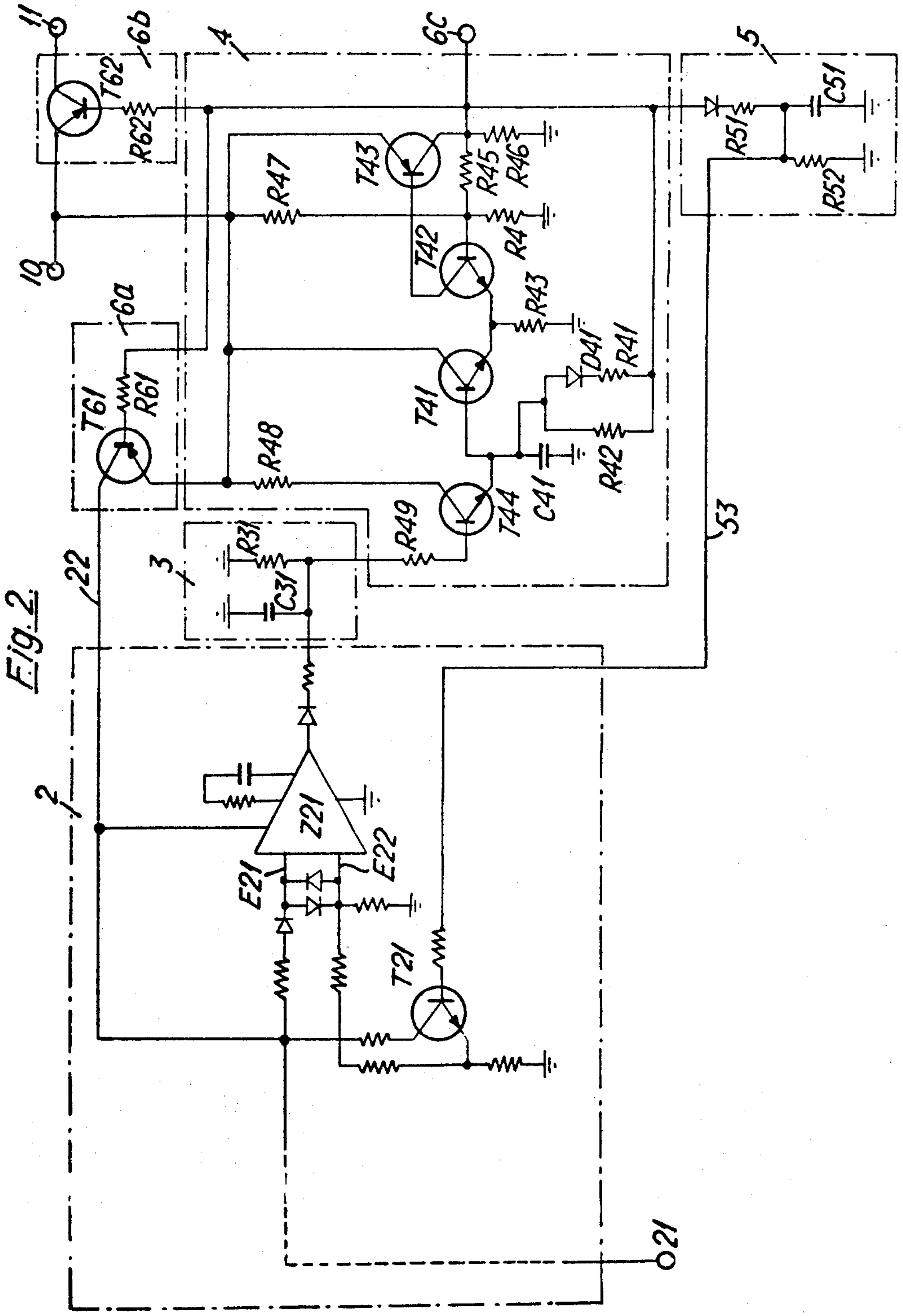
FIG. 2 shows in detailed form some elements characteristic of the invention.

FIG. 2 shows the details of a circuit according to a preferred embodiment example the elements making up the device.

There is found here the speech signal detector device 2, the delay circuits 3 and 5, the clock 4, the switching means which comprise three parts 6*a*, 6*b*, 6*c*. The part 6*a* allows of the feeding of the detector 2 supplied by the connection 22 to be cut off. The part 6*b* allows of the feeding of the receiver 1 supplied by the connection 11 to be cut directly. The part 6*c* allows the cutting off circuit 7 to be put out of service. The general feed is supplied by way of conductor 10.

The speech detection signal device 2 will not be described in detail here for it is like that shown in FIG. 4 of the patent No. 1,494,154 above mentioned. Only its output stage is shown schematically and comprises a differential amplifier Z21 delivering rectangular signals of duration equal to that of the detected speech signals. This amplifier Z21 is connected to the transistor T21 able to keep it out of operation under the control of the circuit thanks to the connection 53.

The first delay circuit 3 is made up of a resistance R31 and of a capacitor C31 able to be charged rapidly but of slow discharge.

The delay circuit 5 corresponds to the duration of setting the receiver going and is made up mainly of resistances R51, R52 and capacitor C51.

Clock 4 of the conventional type, comprises essentially transistors T41, T42, T43, T44 and capacitor C41, which with resistances R41 and R42 fixes the duration of the short and long times of the clock period.

This clock 4 has for input the base of the transistor T44 which is fed by the signals supplied by the amplifier Z21. This transistor T44 is connected to the base of the transistor T41 which with the transistor T42 constitutes the output device of the clock; it is by virtue of this connected to the switching means *6a*, *6b*, *6c*.

The switching means *6a* and *6b* are conventionally realized with transistors but can use any other unit, the transistors T61 and T62, which here make them up, have their respective bases connected to the clock output, that is to the collector of the transistor T43.

The third part *6c* of the switching means is constituted by a direct connection to the clock output which can be used for the control of the cut-off feed circuit 7 schematically representing as a function of time the feed control and detection voltage.

The curves of FIGS. *3a* and *3b* allow the process of operation of the device according to the invention to be explained.

At the time of applying power to the device, which corresponds on curve *3a* to the intersection of the coordinate axes, the feed of the receiver 1 and of the speech detector 2 are cut by the clock 4. These feeds are in fact controlled by the switching means *6a*, *6b*, *6c*. The transistors such as T61 and T62 making up these switching means are kept in nonconducting condition by the transistor T43 which positively polarises their respective bases. The capacitor C41 of the clock and C51 of the second delay circuit are charged. The capacitor C41 charged through a high resistance R42 reaches a charge q1 at the time 71 of FIG. *3a;* this charge unblocks the transistor T41 and then allows conventionally the unblocking of the transistors T61, T62. The feed of the receiver shown by 81 and of the detector is then assured. The time less circuit has a normal operating less than that of the receiver. To avoid the detector sending an erroneous output signal capable of keeping the feed at a normal level due to the bias of the clock 4 and of the delay circuit 3, the delay circuit 5 renders the transistor T21 conducting. The transistor T21 while conducting keeps the level of the input signal of the amplifier Z21 at a value lower than that of the reference or control. This transistor T21 is kept conducting by the delay circuit 5 during a time longer than that of setting into normal operation of the receiver, for example 150 milliseconds. At the end of this time of setting into operation corresponding to the time 72 of FIG. *3a*, the capacitor C51 of the delay circuit 5 is discharged, the transistor T21 is blocked, the signal applied at the affected input of the differential amplifier is then that received by the detector. The curve 82 corresponds to the normal operation of the detector 2. It is supposed that there has not been any transmission and the received signal cannot in this case control the keeping of the feed at the normal level.

The capacitor C41 is in course of discharge during this time through R42, and at the time 73 its discharge is such that the transistor T41 is blocked by the polarisation of its base. The feeds are again cut by the transistors T61, T62 blocked by the conduction of the transistor T43. The capacitors C41 and C51 again charge. At the time 74 the capacitor C41 is again charged through the resistance R42, these elements being such that the discharge time through the resistance R41 is about five times shorter than the charge time. In the same way as before the feed is reestablished, again it is kept during a determined time by discharge of the capacitor C41, during this time the output of the detector 2 cannot give any signal being blocked during the time of setting into operation due to the discharge of the capacitor C51.

It can be supposed by referring to FIG. 3b that there can be received on the receiver using the watching device an apparent transmission between the times 75 and 76. At the time 76 the clock 4 controls the feed at the end of the charge of C41, the detector is blocked by the capacitor C51 for the establishing of the normal operation of the receiver. At the time 77 the capacitor C51 has freed the detector; the latter having recognized a speech signal supplies at the output of the amplifier Z21 a voltage of rectangular form. This voltage charges the capacitor C31 of the delay circuit 3 and controls by the transistor T44 of the clock 4, the maintenance of the feed so long as a speech signal is collected. When the signal is interrupted between two words the capacitor C31 keeps the polarity of the base of the transistor T44 and hence the feed.

At the end of conversation corresponding to 78 on FIG. *3b* a speech signal is no longer collected, the capacitor C31 is completely discharged through the resistance R31. When the capacitor is discharged either to the point 78 of FIG. *3b*, the transistor T44 is blocked anew, entailing in consequence the transistor T41. The feeds of the receiver 1 and the detector 2 are again cut for a duration corresponding to the charging of the capacitor C41. The assembly then takes up again its alternate operation.

Although the principles of the present invention may have been described above in relation with a particular embodiment example, it will be clearly understood that the said description is made only by way of example and does not limit the scope of the invention.

What we claim is:

1. Apparatus for controlling power supplied to a single side band receiver at normal and reduced levels comprising a detection device coupled to a single side band receiver for detecting speech signals from said receiver, the detection device responding to speech signals greater in amplitude than a predetermined noise amplitude to provide output signals, clock means coupled to said detection device to receive said output signals, said clock means providing alternate clock pulses of relatively short time duration and of relatively long time duration, switching means actuated by the clock pulses, said switching means providing signals to turn said receiver to a normal power level in response to pulses of short duration and to turn said receiver to a reduced power level in response to pulses of long duration, and said clock means responding to receipt of continuing output signals to operate said switching means to maintain said receiver at the normal power level.

2. Apparatus according to claim 1, comprising a delay circuit inserted between the detection device and the clock means, the time constant of this delay circuit being greater than the mean duration of interruption being two consecutive speech words of a conversation, whereby the delay circuit supplies continuing output signals to operate said switching means and maintain said receiver at a normal level between consecutive speech words.

3. Apparatus according to claim 1, comprising a delay circuit inserted between an output terminal of the clock means and an output stage of the detection device, the time constant of this delay circuit providing a delayed control to the detection device for a period longer than the time required to place a receiver in continuous service.

4. Apparatus according to claim 1, in which the duration of the short and long clock pulses are regulated by a delay circuit of double time constant consisting essentially of a single capacitor mounted in parallel with two shunt resistances, a diode being connected in series with one of the resistances, this delay circuit being connected between the input and the output of the clock.

5. Apparatus according to claim 1, in which the speech signal detection device includes in an output stage a threshold detector and a differential amplifier, said differential amplifier including a unidirectional reference input terminal and a comparision input terminal, means coupling the comparision input terminal to receive signals from an early stage of the detection device and signals from the threshold detector, means coupling the reference input terminal to receive signals from the threshold detector, and means coupling a control element of the threshold detector through a delay circuit to the electronic clock, said delay circuit maintaining signals at the comparison input at a low level during the length of the time constant of the delay circuit.

6. Apparatus according to claim 1, comprising switching means coupled between the clock output and the detection device, said switching means turning the detection device "on" and "off" in accordance with said clock pulses.

* * * * *